(12) United States Patent
Guduru

(10) Patent No.: US 9,092,186 B2
(45) Date of Patent: Jul. 28, 2015

(54) METHOD AND APPARATUS FOR DYNAMIC SHARING OF DESKTOP CONTENT

(75) Inventor: Vijaykrishna P. Guduru, Denville, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 458 days.

(21) Appl. No.: 13/465,687

(22) Filed: May 7, 2012

(65) Prior Publication Data

US 2013/0293667 A1  Nov. 7, 2013

(51) Int. Cl.
| | |
|---|---|
| G06F 3/00 | (2006.01) |
| G06F 3/14 | (2006.01) |
| H04M 3/56 | (2006.01) |
| H04N 7/14 | (2006.01) |
| H04L 29/06 | (2006.01) |
| H04L 12/18 | (2006.01) |
| G06Q 10/10 | (2012.01) |

(52) U.S. Cl.
CPC .............. *G06F 3/1454* (2013.01); *G06Q 10/10* (2013.01); *H04L 12/1827* (2013.01); *H04L 65/403* (2013.01); *H04L 65/4015* (2013.01); *H04M 3/567* (2013.01); *H04N 7/147* (2013.01); *G09G 2340/04* (2013.01); *G09G 2350/00* (2013.01); *H04L 12/189* (2013.01)

(58) Field of Classification Search
CPC .................................................... H04W 72/10
USPC ......................................... 715/755, 756, 759
See application file for complete search history.

(56) References Cited

U.S. PATENT DOCUMENTS

| | | | |
|---|---|---|---|
| 6,654,034 B1* | 11/2003 | Kanevsky et al. | 715/764 |
| 7,945,857 B2* | 5/2011 | Deutscher et al. | 715/725 |
| 8,065,614 B2* | 11/2011 | Ma et al. | 715/723 |
| 8,140,698 B2* | 3/2012 | Codella et al. | 709/231 |
| 8,347,228 B1* | 1/2013 | Kates et al. | 715/821 |
| 8,416,280 B2* | 4/2013 | Oike | 348/14.09 |
| 8,522,289 B2* | 8/2013 | Athsani et al. | 725/87 |
| 2004/0130568 A1* | 7/2004 | Nagano et al. | 345/733 |
| 2007/0180401 A1* | 8/2007 | Singh et al. | 715/794 |
| 2009/0182889 A1* | 7/2009 | Hurst et al. | 709/231 |
| 2012/0144288 A1* | 6/2012 | Caruso et al. | 715/234 |
| 2012/0144336 A1* | 6/2012 | Pinter et al. | 715/772 |
| 2013/0159880 A1* | 6/2013 | Bhogal et al. | 715/753 |
| 2013/0163953 A1* | 6/2013 | Peacock | 386/231 |
| 2013/0246576 A1* | 9/2013 | Wogsberg et al. | 709/219 |

* cited by examiner

*Primary Examiner* — Omar Abdul-Ali

(57) ABSTRACT

Method and related systems for dynamically sharing desktop contents during a video communications call is disclosed. The available communications bandwidth for transmitting desktop content and video content from a host computer to a client computer is divided between the desktop and video contents based on priority levels assigned to each of the desktop and video contents. The display area of the client computer may also be adjusted based on the priority levels.

23 Claims, 4 Drawing Sheets

METHOD AND APPARATUS FOR DYNAMIC SHARING OF DESKTOP CONTENT

BACKGROUND

Teleconferencing may be used to enable communication among parties in various geographical locations in person. Videoconferencing is a type of teleconferencing that allows users to see one another during a teleconferencing session. Further, desktop sharing sessions may be used to permit computer users to access other user's desktop items remotely.

Conventional videoconferencing, telepresence, and desktop sharing techniques do not provide mobility to a participant. Although mobile teleconferencing schemes have been introduced in the art, most of these methods suffer from bandwidth, quality, and latency issues dictated by the mobile communication networks.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

Figure 1:
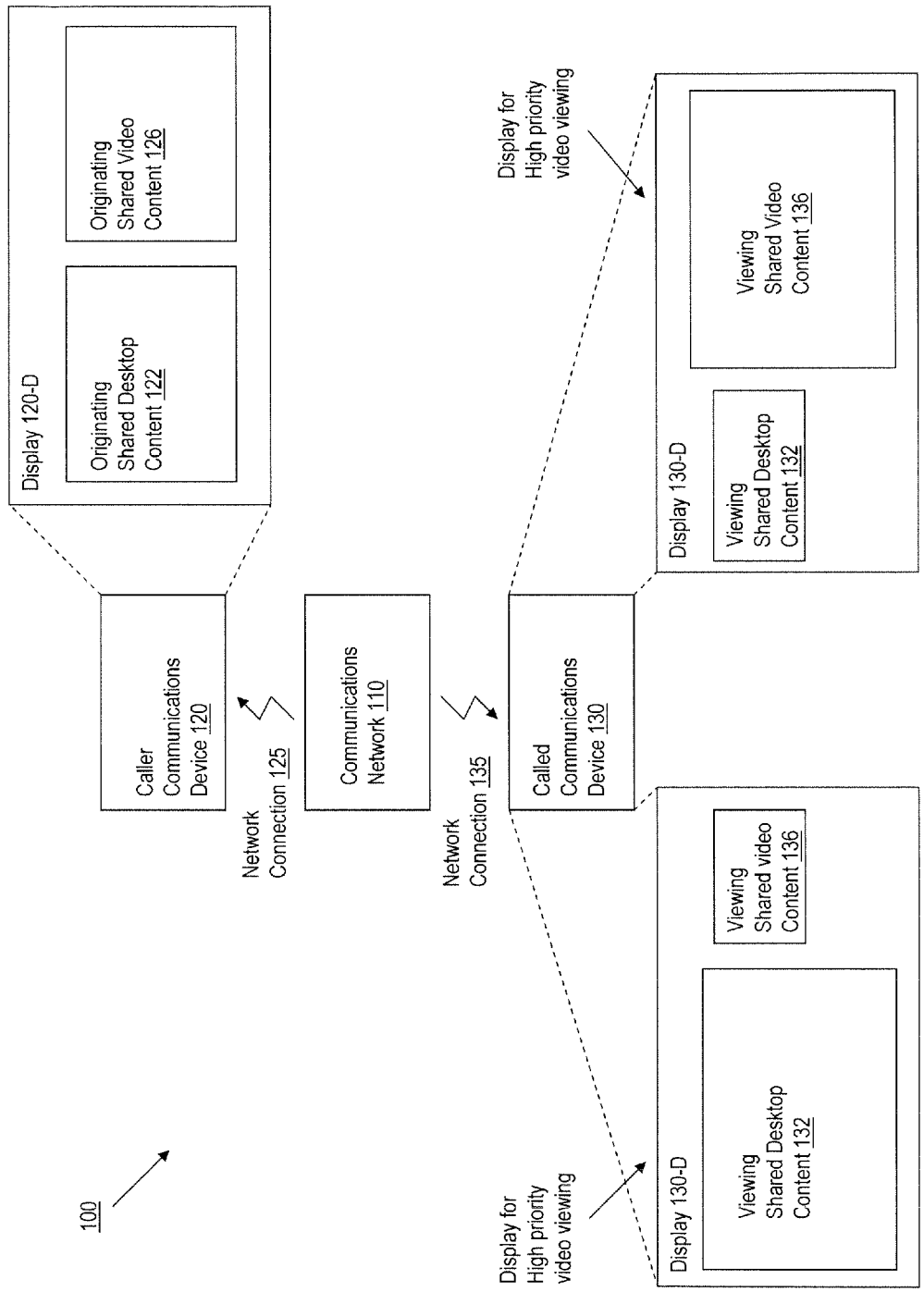
FIG. 1 is an illustration of a perspective view of a communications system according to certain embodiments disclosed herein

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

Certain embodiments disclosed herein relate method and corresponding systems for dynamically sharing desktop content during a video communications call (e.g., mobile video communications call).

In certain embodiments, graphical content and video content originating from a host computer computing device are displayed at a host display screen. A first priority level for displaying the graphical content originating from the host computing device and a second priority level for displaying the video content originating from the mobile/client communication device are determined and the available communications bandwidth for transmission of the graphical content and the video content from the host computing device to a client computing device is allocated based on the first and second priority levels. The graphical content and video content displayed on the host display screen are displayed at the client display screen such that the graphical content appears at a first portion of the client display screen and has dimensions that are determined based on the first priority level and the video content appears at a second portion of the client display screen and has dimensions that are determined based on the second priority level.

In some embodiments, graphical content and video content originated from a host computing device are displayed at a client display screen such that the graphical content appears at a first portion of the client display screen and the video content appears at a second portion of the client display screen. Further, the graphical content has a first display priority level associated thereto and the video content has a second display priority level associated thereto. Each of the graphical content and video content are transmitted, from the host computing device, over a communications bandwidth allocated as a function of the first and second display priority levels. The communications bandwidth allocated to each of the graphical content and video content is a subset of an overall bandwidth allocated by the network to the client computing device. Dimensions of the first portion of the client display screen are adjusted based on the first priority level and dimensions of the second portion of the client display screen are adjusted based on the second priority level.

In some embodiments, at a host computing device, a first priority level for displaying graphical content appearing on an associated host display screen is determined. A second priority level for displaying video content appearing on the associated host display screen is also determined. Available communications bandwidth for transmission of the graphical content and the video content from the host computing device to a client computing device is allocated based on the first and second priority levels. The graphical content and the video content are forwarded over the allocated bandwidth to the client computing device for display on a display screen of the client computing device.

In certain embodiments, allocation of the available communications bandwidth for transmission of the graphical content and the video content may be done by comparing the first and second priority levels and allocating a larger portion of the available communications bandwidth to the content having a higher priority level. In some embodiments, the first and second priority levels may be determined as a function of at least one of input from a user of the host computing device, input from a user of the client computing device, usage of processing power by the graphical content, or visual material presented in the video content.

In some embodiments, the first and second priority levels may be updated during a communications call occurring among the host computing device and the client computing device. Updating the first and second priority levels may be done by determining an activity measure of the graphical content and the video content, comparing the determined activity measure with a predetermined threshold, and in an event the activity measure falls above the predetermined threshold, updating the first and second priority levels to assign a higher priority level to the content whose activity measure falls above the threshold and assign lower priority levels to other contents.

In some embodiments, the allocation of the communications bandwidth to the graphical content and the video content may be updated in response to the updated priority levels. In some embodiments, the dimensions of the portions of the client display screen occupied by the graphical content and the video content may be updated in response to the updated priority levels.

FIG. 1 is an illustration of a perspective view of a communications system 100 according to certain embodiments disclosed herein. The communications system 100 includes a caller communications device 120 (i.e., the host device) that establishes a communications call to a called communications device 130 (i.e., the client device) via the communications network 110.

The caller 120 and called 130 communications devices may be mobile (e.g., wireless) or non-mobile (e.g., desktop) communications devices with video capabilities. In some embodiments, any communications device that can support real-time peer-to-peer communications and support applications the provide user interaction may be used. Examples of the communications devices that may be used with the embodiments disclosed herein include, but are not limited to, mobile phones, Personal Digital Assistants, portable televisions, laptop computers, digital video recorders, etc.

Each communications device 120, 130 includes a display 120-D, 130-D for displaying shared desktop content and/or shared video content. In certain embodiments, the display 120-D, 130-D may be a built-in display. In some embodiments, the display 120-D, 130-D may be a separate unit that is coupled (e.g., wirelessly or through a physical connection such as a network connection) with the communications device 120-D, 130-D. The video capabilities of the communications device 120, 130 may be provided by a module built-into the communications device 120. In certain embodiments, the module that provides the communications device 120, 130 with video capabilities may be an independent unit that is coupled with the communications device 120, 130.

Depending on the type of communications device 120-D, 130-D used (e.g., mobile or desktop), the caller 120 and called 130 communications devices connect to the communications network 110 through appropriate communication network 110 and communications links 125, 135 (e.g., wireless and/or wired communications links).

The communications network 110 may be a high-bandwidth and/or band-limited communications network. In some embodiments, the communications network 110 may be a wireless communications network. In certain embodiments, the communications network may be a local area network (LAN), metropolitan area network (MAN), Radio Access network (RAN), or a wide-area network (WAN), such as the Internet. In some embodiments, the network 110 may include one or more segments of a general purpose network (e.g., Internet, LAN, and/or other networks (e.g., Internet protocol (IP) network).

In some embodiments, the calling 120 and called communications device 130 may include a transceiver (not shown, e.g., wireless transceiver) for transmitting and/or receiving shared desktop 122, 132 and video content 126, 136. In some embodiments, the transceiver may be a built-in transceiver. In certain embodiments, the called communications device 130 may receive shared desktop 122, and shared video content 126, originated from a caller communications device 120, through mediums such as a data card, modem, LAN link, or other link or device that, alone or in combination with other devices, is capable of transmitting and receiving the shared desktop 122, 132 and video content 126, 136 over the communications network 110 and displaying (and, if needed, storing) the shared desktop 122, 132 and video content 126, 136.

The calling 120 and called communications device 130 may communicate directly or through intermediary communications devices (not shown). For example, in some embodiments, a communications server (not shown) may facilitate communications between the caller communication device 120 and called communications device 130. In some embodiments, the caller communications device 120 and called communications device 130 may communicate through secure and/or encrypted communications links.

In some embodiments, the calling 120 and called communications device 130 may initiate a conferencing communications call with one another. The conferencing communications call may allow the sharing of data (e.g., data relating to desktop contents), video, and audio between the calling 120 and called communications device 130. In some embodiments, the conferencing communications call allows simultaneous two-way data, audio and video signal transmissions between the calling 120 and called communications device 130.

When using mobile communications devices that communicate with one another through mobile communications links, bandwidth constraints and network latencies may effect the interaction experience of communications device 120, 130 users. Other factors that can further impact the interaction experience may include the amount of data being shared, the number of applications being executed by the caller communications device 120, and the amount of data being loaded by the called communications device 130. Further, in a mobile communications device, screen size constraints may complicate the interaction experience since such devices typically have small screens and any information displayed on their screen needs to be formatted for viewing on their small screen.

As shown in FIG. 1, a caller communications device 120 may elect to share data (e.g., desktop content 122) and/or video content 126 with a called communications device 130. For example, a calling party (not shown) operating the caller communications device 120 may elect to present one or more desktop items (e.g., presentation slides, representing originating shared desktop content 122) to a called party (not shown) operating the called communications device 130. The calling party may further wish to share a video stream (e.g., a video stream of him/herself presenting the slides, representing originating shared video content 126) with the called party. This situation may be complicated by limited bandwidth when at least one of the calling or called parties is operating a mobile communications device through a mobile communications network.

In order to overcome the difficulties due to limited bandwidth in a mobile live video desktop sharing call, certain embodiments utilize a dynamic approach that assigns various priority levels to the items (e.g., data or video) being shared. Specifically, the embodiments determine the shared item (e.g., data or video) to which the highest level of priority should be assigned. The priority levels may be added automatically (e.g., using statistical measures) or manually (e.g., by overriding automatically assigned priority levels). For example, when a user is first presenting a desktop item (e.g., a presentation slide) or is actively using and/or executing desktop item (e.g., running an application program, moving between slides in the presentation), the highest level of priority may be assigned to the shared desktop item 122 and the shared video item 126 and/or any other shared items are given lower priority levels. The determined priority levels are used to assign appropriate bandwidth to each shared item.

For example, if the highest level of priority is assigned to the shared desktop item 122, the amount of bandwidth assigned to sharing the desktop item 122 may be increased. In some embodiments, instead of requesting additional bandwidth from the communications network 100, the bandwidth from the communications network 100 remains the same but is specifically allocated by the communication network 100 or one of the communication devices 120, 130 such that the amount of bandwidth allocated to lower priority items (e.g., lower priority shared video content 126) may be decreased. In other words, in one embodiment the total bandwidth allocated for content transmitted from one of the communication devices and/or for content received by another of the communication devices may remain unchanged even though the bandwidth distribution among the various types of content being shared may change.

In some embodiments, priority levels may be assigned based on the type of content being shared. For example, in certain embodiments, higher priority levels may be assigned to shared video content 126 and lower priority levels may be assigned to shared desktop contents 122. In some embodiments, a higher priority level may be assigned the shared desktop content 122. If other types of content are being shared, each may be assigned a priority level, which is then used to allocate the available bandwidth (without increasing the total amount of bandwidth).

In some embodiments, the display area 130-D allocated to each shared item may also be adjusted depending on the priority level assigned to that item. For example, in the embodiment outlined above, a larger portion of the display area 130-D of the called communications device 130 may be assigned to viewing the high priority shared desktop content 132. The lower priority shared content (e.g., lower priority shared video content 126) is assigned to a smaller portion 136 of the display area 130-D.

In some embodiments, numerical values describing certain activity levels in the shared video 122 and shared desktop contents 126 may be used to determine the priority levels. For example, numerical values reflecting factors such as intensity, spectrum, and/or volume of the voice of a participant may be used to determine the activity level of that participant. Other statistical measures, such as mean or standard deviation of a participant's activity level, may be used to determine the priority levels. For example, in certain embodiments, relative usage of processing power by each of the shared items and video 122, 126 may be considered to assign appropriate priority levels to the items.

In some embodiments, a predetermined threshold may be used to evaluate the changes in activity levels and assign priority levels. Specifically, the level of change for each activity level, over a predetermined time period, may be calculated and the calculated value may be compared with the predetermined threshold. If the change level falls below the predetermined threshold, the assigned priority levels remain unchanged. However, if the deviation falls above the threshold, a change in the priority level is triggered.

In some embodiments, activity levels of a calling party displayed in a shared video may be monitored by a processor (not shown) in the communications device 120, 130. For example, if the user is still and silent, or speaking in a continuous tone or moving slightly, the priority level assigned to the video of this user may remain constant. Although, activities, such as slight movement of the caller party or background noise, may be considered, these activities are compared with recent user activities (e.g., in previous video frames) and a difference value for the activities is determined. The difference value is compared against a threshold and if it falls below the threshold, the change in calling party actions is deemed negligible and, therefore, the assigned priority level to the shared video remains constant.

Similarly, when there is a significant change in the caller party's behavior in the video (e.g., speaking with higher volume or making physical gestures), this change is reflected in the difference value. The difference value is compared against a threshold and if it falls above the threshold, the change in calling party actions is deemed significant and, therefore, a change in the assigned priority level to the shared video is triggered.

In certain embodiments, the priority level of the shared items may be varied and adjusted during a communications call. Specifically, in certain embodiment it is determined whether the priority level assigned to specific shared items should be changed and revised the assigned priority level accordingly. For example, in the embodiment outlined above, if the caller party is exhibiting an increased level of activity (e.g., with respect to factors such as audio volume and/or tone or physical motion), a processor (not shown) in the calling 120 or called 130 communications device may dynamically alter the assigned priority levels and assign the highest level of priority to the shared video content 126 and a reduced level of priority to the shared desktop content 122. The priority levels may be used to determine the appropriate allocation of bandwidth to the shared items.

In certain embodiments, the display area of the shared items may dynamically be altered. For example, if the highest level of priority is assigned to shared video, the screen area displaying the video 136 is adjusted to occupy a larger portion of the display area 130-D. Similarly, the screen area assigned to displaying shared desktop content 132 is adjusted to occupy a smaller portion of the display area 130-D.

In some embodiments, the priority levels used in bandwidth allocation are assigned based on the level of activity in the shared application 126 and video 122. Specifically, the priority level assigned to a shared desktop content 122 may be increased or decreased in response to an increase or decrease in the level of usage (e.g., execution or loading) of the shared desktop content 122. Once the priority level assigned to a shared item 122 or shared video 126 is increased or decreased, the priority levels assigned to other shared items or decreased or increased accordingly.

In some embodiment, percentage priority levels may be assigned to the shared content 122 and shared video 126. Specifically, if a shared item is assigned a priority level of n %, other shared items are, collectively, assigned the priority level of 100-n %.

In some embodiments, equal priority levels may initially be assigned to all shared items 122, 126. Further, the viewing display areas 132, 136 for all contents may initially be equal in size. In alternate embodiments, the video 126 (or desktop content 122) shared by the caller party may be assigned to a higher priority level and presented in a larger portion of the display area 130-D of the called party.

In some embodiments, higher priority items may be displayed in certain preferred locations within the display area 130-D of the called party. For example, in some embodiments, the high priority shared video content 126 may be displayed in the center of the display area 130-D and other shared items may be presented in various other locations within the display area 130-D. In other embodiments, corners may be chosen as predetermined locations (e.g., one set of diametrically opposing corners may be used for higher priority display items and the other set of diametrically opposing corners may be used for lower priority display items). In certain embodiments, the location of an item may be changed based on the priority level assigned to that item. For example, in some embodiments, higher priority video content 126 may be initially displayed in the center of the display area 130-D. However, in an event the priority of the video changes (e.g., desktop content 122 gains higher priority), the item having the highest priority may take the location within the display area 130D that was previously occupied by the video content 126 and the video content 126 may be moved to another location within the display area 130D.

In certain embodiments, factors other than priority levels may control the sizes of the viewing display areas 132, 136. For example, in some embodiments, the viewing display areas 132, 136 may be limited to a predetermined size (e.g., the maximum size previously set by the manufacturer of the software used to the display the video content 126). In such situations, the viewing area 132, 136 may not be increased above the predetermined size. Further, in certain embodiments, the viewing display areas 132, 136 may not be able to be increased for viewability reasons, which itself may be a function of the placement position of the items on the display area 130-D. For example, if the high priority video is assigned to n % of the display area 130-D, the lower priority items are assigned to 100-n % of the display area 130-D, and the predetermined maximum area assigned to the video is k % of the display area 130-D, the predetermined maximum area may be reached. In such situation, certain embodiments may prevent further alteration of the sizes of the viewing areas 132, 136. In certain embodiments, the size of the viewing area for the item having the highest priority level may be determined as n×k %.

Figure 2:
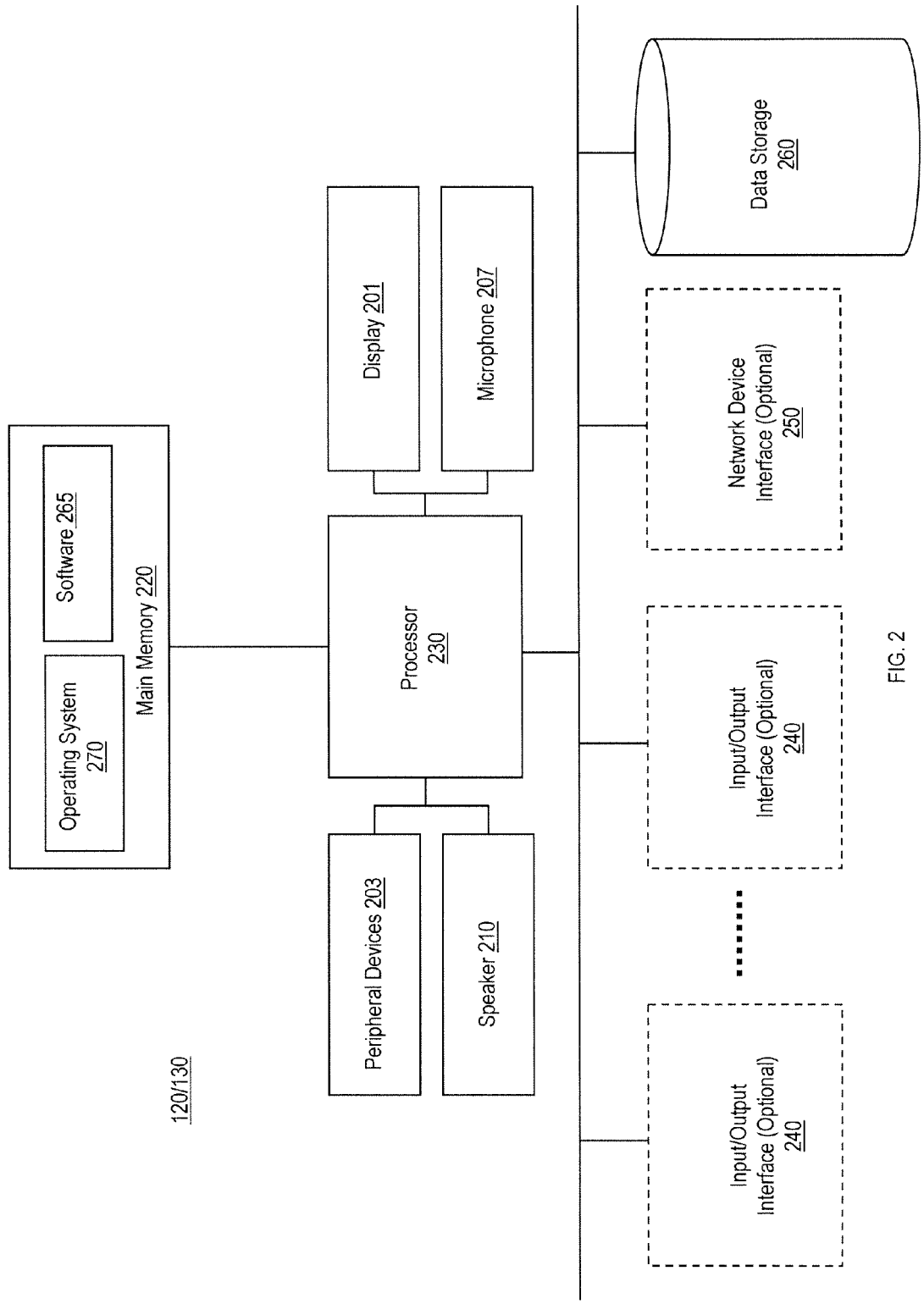
FIG. 2 is a block diagram of a communications device that may be used with certain embodiments disclosed herein.

FIG. 2 is a block diagram of a communications device 120, 130 that may be used with certain embodiments disclosed herein. The device 120, 130 may include a processor 230 (e.g., Central Processing Unit) that carries out the operations of the device, executes various instructions, and manipulates data structures from the main memory 520. The processor may be coupled to a main memory 220. The main memory 220 may be a computer-readable memory and include combinations of non-volatile memory devices. The main memory 220 may be configured to hold various software 265 and computer-executable instructions and data structures including computer-executable instructions and data structures that implement aspects of the techniques described herein. For example, in some embodiments, the software 265 may implement the procedures for determining priority levels for shared content, triggering a change in allocated bandwidth based on the priority levels, and/or triggering a change in display screen area assigned to shared content based on the priority levels. Alternatively, in some embodiments, an application program (not shown) or a module (not shown) positioned in the network 110 (shown in FIG. 1) may determine the priority levels for shared content, trigger a change in allocated bandwidth based on the priority levels, and/or trigger a change in display screen area assigned to shared content based on the priority levels.

The main memory 220 may also include an operating system 270 that implements various conventional operating system functions including memory management and controlled access to various devices, such as a database storage 260, and task and process scheduling. The data storage 260 may include content, for use with embodiments disclosed herein, such as images, text, video, audio, and computer applications.

The processor 230 may be coupled to various interfaces via an input/output (I/O) device interface 240. The I/O device interface 240 may include logic to interface with various input and/or output devices, such as a keypad or mouse and with the processor 230, and allow signals to be transferred between the processor 230 and other components. Further, interface devices such as speaker 210, microphone 207, peripheral devices 203, and display 201 may be used to transfer signals to/from the processor 230 and main memory 220. In some embodiments, the input/output interface 240 may include a USB port (not shown).

In some embodiments, the device may include a network device interface 250 that provides the device with access to a network connection. In some embodiments, the network interface 240 may be used to transmit and receive the signals used for sharing content and video.

Figure 3:
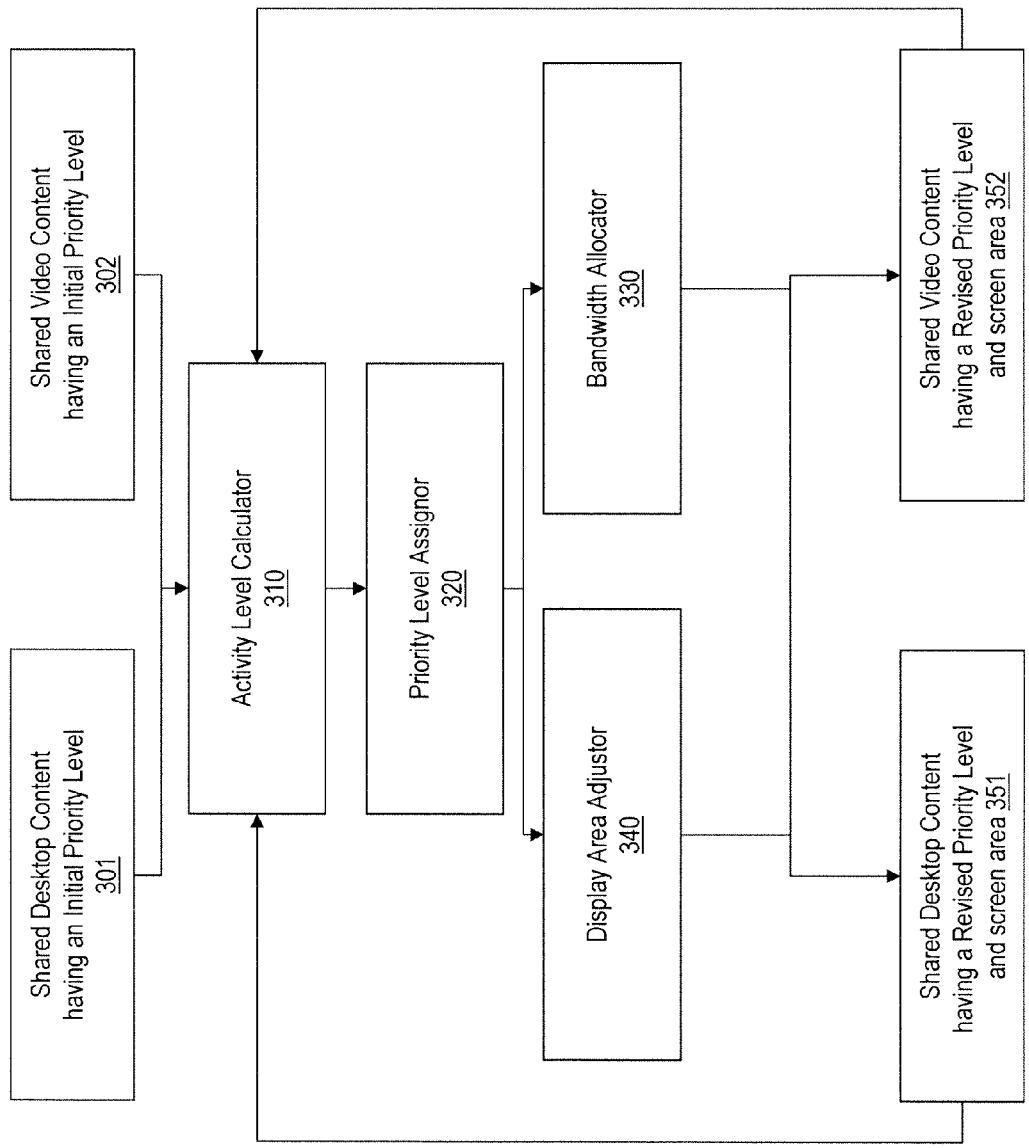
FIG. 3 is a block diagram for dynamically sharing desktop content according to certain embodiments disclosed herein.

FIG. 3 is a block diagram for dynamically sharing desktop content according to certain embodiments disclosed herein. These procedures may be performed by various elements within the communications device 120, 130 (FIG. 1) or a module/application program (not shown) with the network 110 (FIG. 1). As described above, a calling party (not shown) may use a communications device 120 (FIG. 1), such as a mobile communications device, to initiate a call to a called party (not shown). The calling party may elect to share desktop content and video content with the called party. The shared desktop content may be presented with an initial priority level 301. Similarly, the shared video content may be presented with an initial priority level 302. The initial priority levels for the shared video and desktop content may be equal or different. In some embodiments, a user (e.g., a calling party or a called party) may set the initial priority levels for the shared video and desktop content.

An activity level calculator 310 may determine the activity levels in the shared video and desktop content. In certain embodiments, the activity level calculator may evaluate changes in activity levels in each of the shared video and desktop content and compare the evaluated changes against a predetermined threshold and institute a change in the priority levels in an event the change in the priority level falls above the predetermined threshold. In certain embodiments, in addition to, or in place of, an activity level calculator 310, user input (e.g., input from the caller or called party) may be used to provide any change in priority levels.

A priority level assignor 320 assigns appropriate priority levels to the shared video and desktop content based on the calculated activity levels or user input. A bandwidth allocator 330 uses the assigned activity levels to allocate appropriate bandwidth levels to the shared video and content. A display area adjustor 340 may also use the assigned priority levels to adjust the display area (in a called party display screen) assigned to each item (e.g., shared desktop and shared video content). Although not shown in FIG. 3, in certain embodiments, the display area adjustor 340 may adjust the display areas assigned to each item in response to a change in bandwidth allocation. Shared desktop content 351 and video content 352 having revised priority levels, adjusted bandwidth, and resized screen area are then displayed in a called party screen.

In some embodiments, the activity level calculator 310 may continue to monitor activity levels in the shared video and desktop content and revise the assigned priority levels, if desired.

Figure 4:
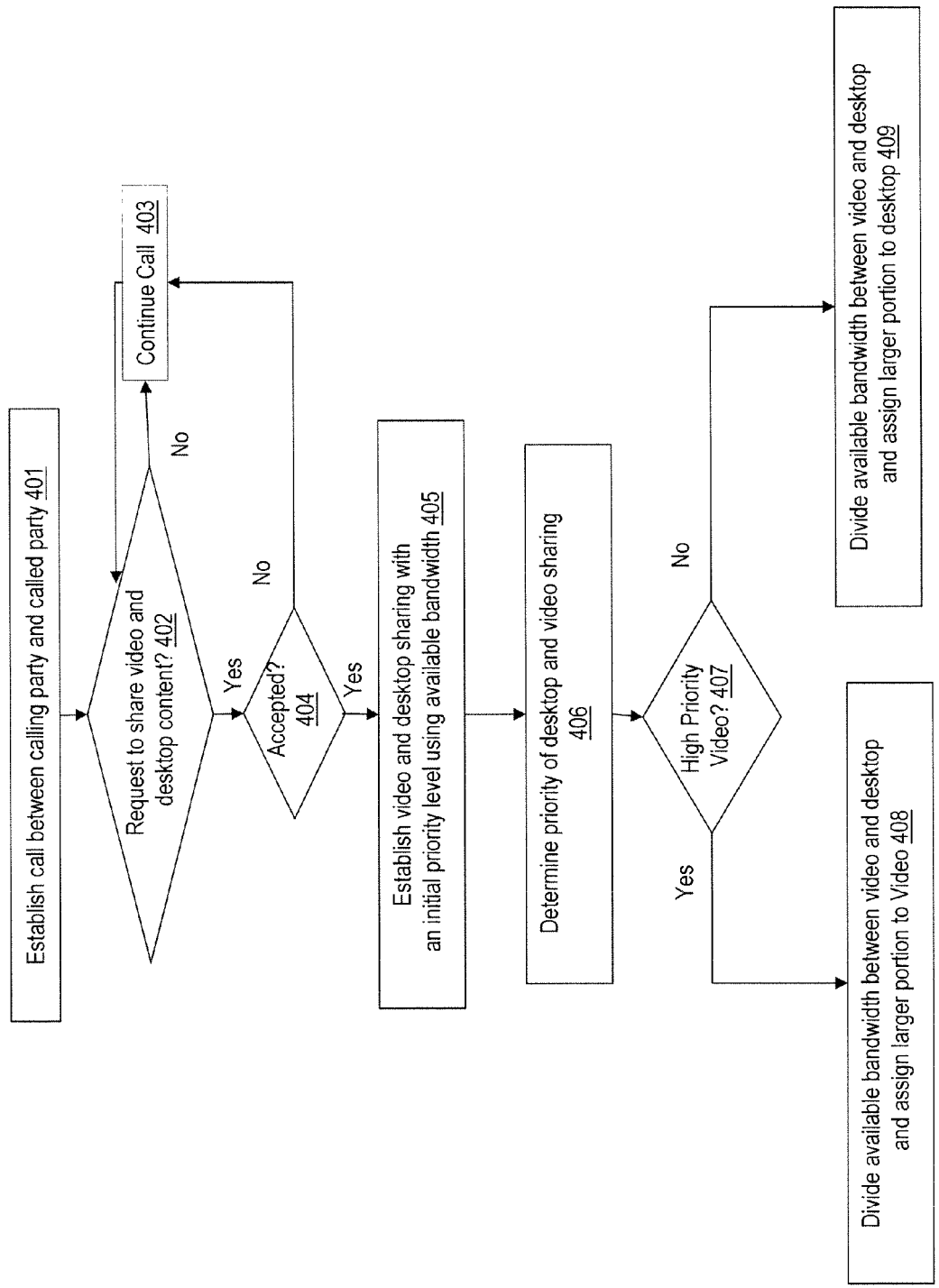
FIG. 4 is a flow diagram of procedures for dynamically sharing desktop content according to certain embodiments disclosed herein.

FIG. 4 is a flow diagram of procedures for dynamically sharing desktop content according to certain embodiments disclosed herein. In some embodiments, a communications call may be initiated between a calling party and a called party 401. The calling and/or the called party may request to share video and desktop content 402. If the request is rejected, the call can continue 403. If the request is accepted, a video sharing and a desktop sharing session may be initiated 404. In some embodiments, the video and desktop may be given an initial level of priority. The initial level of priority may be assigned by a user (e.g., calling or called party) 405.

Priority levels for the shared desktop and video may be determined continuously or periodically 406 over a predetermined time period (e.g., 1-2 seconds, 5 seconds, 10 seconds, etc.). If the shared video is determined to have a higher priority than the shared desktop 407, the available bandwidth is divided between the shared video and the shared desktop content such that a larger portion of the bandwidth is assigned to the shared video 408. In certain embodiments, the display content on the called party's screen may also be adjusted to assign a larger portion of the screen to the high priority video content.

Similarly, if the shared desktop content is determined to have a higher priority than the shared video, the available bandwidth is divided between the shared video and the shared desktop content such that a larger portion of the bandwidth is assigned to the shared content 409. In certain embodiments, the dimensions of the displayed content on the called party's screen may also be adjusted to assign a larger portion of the screen to the content having a higher priority level.

Embodiments of the present invention may be used to share desktop content among multiple participants. For example, in certain embodiments, multiple participants may participate in a screen sharing session. In certain embodiments, each participant may have his/her individualized priority levels for a shared item, which may differ from the priority value assigned to the same item by other participant. As such, the allocated bandwidth, screen size, and location assigned to the shared item may differ from one participant to another.

In some embodiments, the caller device 120 (FIG. 1), or a caller party (not shown) operating the caller device 120, may determine the priority levels assigned to the shared items. In certain embodiments, the called device 130 (FIG. 1), or a called party (not shown) operating the called device 130, may assign appropriate priority levels to the shared items. In certain embodiments, items other than desktop content and video content may be shared among the participants. For example, contents such as images, audio, etc. may be shared among the participants.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
   displaying, at a client display screen of a client computing device, graphical content and video content originated from a host computing device, the graphical content appearing at a first portion of the client display screen and the video content appearing at a second portion of the client display screen, the graphical content having a first display priority level associated thereto and the video content having a second display priority level associated thereto, each of the graphical content and video content received, at the client computing device, over a communications bandwidth allocated as a function of the first and second display priority levels, the communications bandwidth allocated to each of the graphical content and video content being a subset of an overall bandwidth allocated to the client computing device; and
   adjusting dimensions of the first portion of the client display screen based on the first priority level and adjusting dimensions of the second portion of the client display screen based on the second priority level.

2. The method of claim 1 wherein adjusting the dimensions of the portions of the client display screen includes comparing the first and second display priority levels and adjusting the dimensions of the content having a higher priority level to occupy a larger portion of the client display screen.

3. The method of claim 1 further including comparing the first and second display priority levels and displaying the content having a higher priority level at a preferred location within the client display screen.

4. The method of claim 1 further including updating the first and second priority levels during a communications call occurring among the host computing device and the client computing device.

5. The method of claim 4 wherein updating the first and second priority levels includes determining an activity measure of the graphical content and the video content, comparing the determined activity measure with a predetermined threshold, and in an event the activity measure falls above the predetermined threshold, updating the first and second priority levels to assign a higher priority level to the content whose activity measure falls above the threshold and assign lower priority levels to other content.

6. The method of claim 4 further including updating allocation of the communications bandwidth to the graphical content and the video content in response to the updated priority levels.

7. The method of claim 6 further including updating the dimensions of the portions of the client display screen occupied by the graphical content and the video content in response to the updated priority levels.

8. A method comprising:
at a host computing device, determining a first priority level for displaying graphical content appearing on an associated host display screen and determining a second priority level for displaying video content appearing on the associated host display screen;
allocating available communications bandwidth for transmission of the graphical content and the video content from the host computing device to a client computing device based on the first and second priority levels, the communications bandwidth allocated to each of the graphical content and video content being a subset of an overall bandwidth allocated to conducting communications between the host computing device and the client computing device; and
forwarding the graphical content and the video content over the allocated bandwidth to the client computing device for display on a display screen of the client computing device.

9. The method of claim 8 wherein allocating available communications bandwidth includes comparing the first and second display priority levels and allocating a larger portion of the available communications bandwidth to the content having a higher priority level.

10. The method of claim 8 further including comparing the first and second display priority levels and displaying the content having a higher priority level at a preferred location within the client display screen.

11. The method of claim 8 further including updating the first and second priority levels during a communications call occurring among the host computing device and the client computing device.

12. The method of claim 11 wherein updating the first and second priority levels includes determining an activity measure of the graphical content and the video content, comparing the determined activity measure with a predetermined threshold, and in an event the activity measure falls above the predetermined threshold, updating the first and second priority levels to assign a higher priority level to the content whose activity measure falls above the threshold and assign lower priority levels to other contents.

13. The method of claim 11 further including updating allocation of the communications bandwidth to the graphical content and the video content in response to the updated priority levels.

14. A system comprising:
a client display screen arranged to display graphical content and video content originated from a host computing device, the graphical content appearing at a first portion of the client display screen and the video content appearing at a second portion of the client display screen, the graphical content having a first display priority level associated thereto and the video content having a second display priority level associated thereto, each of the graphical content and video content being transmitted, from the host computing device, over a communications bandwidth allocated as a function of the first and second display priority levels, the communications bandwidth allocated to each of the graphical content and video content being a subset of an overall bandwidth allocated to the client computing device; and
an adjustor arranged to adjust dimensions of the first portion of the client display screen based on the first priority level and adjust dimensions of the second portion of the client display screen based on the second priority level.

15. The system of claim 14 wherein the adjustor is arranged to adjust the dimensions of the portions of the client display screen by comparing the first and second display priority levels and adjusting the dimensions of the content having a higher priority level to occupy a larger portion of the client display screen.

16. The system of claim 14 wherein the adjustor is further arranged to update the first and second priority levels during a communications call occurring among the host computing device and a client computing device coupled to the client display screen.

17. The system of claim 14 wherein the adjustor is further arranged to update the first and second priority levels by determining an activity measure of the graphical content and the video content, comparing the determined activity measure with a predetermined threshold, and in an event the activity measure falls above the predetermined threshold, updating the first and second priority levels to assign a higher priority level to the content whose activity measure falls above the threshold and assign lower priority levels to other contents.

18. The system of claim 17 wherein the adjustor is further arranged to update allocation of the communications bandwidth to the graphical content and the video content in response to the updated priority levels.

19. The system of claim 17 wherein the adjustor is further arranged to update the dimensions of the portions of the client display screen occupied by the graphical content and the video content in response to the updated priority levels.

20. A system comprising:
a host computing device arranged to determine a first priority level for displaying graphical content appearing on an associated host display screen and determine a second priority level for displaying video content appearing on the associated host display screen;
a bandwidth allocator arranged to allocate available communications bandwidth for transmission of the graphical content and the video content from the host computing device to a client computing device based on the first and second priority levels, the communications bandwidth allocated to each of the graphical content and video content being a subset of an overall bandwidth allocated to conducting communications between the host computing device and the client computing device;
wherein the bandwidth allocator is further arranged to update the first and second priority levels during a communications call occurring among the host computing device and the client computing device; and a transceiver arranged to forward the graphical content and the video content over the allocated bandwidth to the client computing device for display on a display screen of the client computing device.

21. The system of claim 20 wherein the bandwidth allocator is arranged to allocate available communications bandwidth by comparing the first and second display priority levels and allocating a larger portion of the available communications bandwidth to the content having a higher priority level.

22. The system of claim 20 wherein the bandwidth allocator is further arranged to update the first and second priority levels by determining an activity measure of the graphical content and the video content, comparing the determined activity measure with a predetermined threshold, and in an event the activity measure falls above the predetermined threshold, updating the first and second priority levels to assign a higher priority level to the content whose activity measure falls above the threshold and assign lower priority levels to other contents.

23. The system of claim 20 wherein the bandwidth allocator is further arranged to update allocation of the communications bandwidth to the graphical content and the video content in response to the updated priority levels.

* * * * *